Patented June 27, 1950

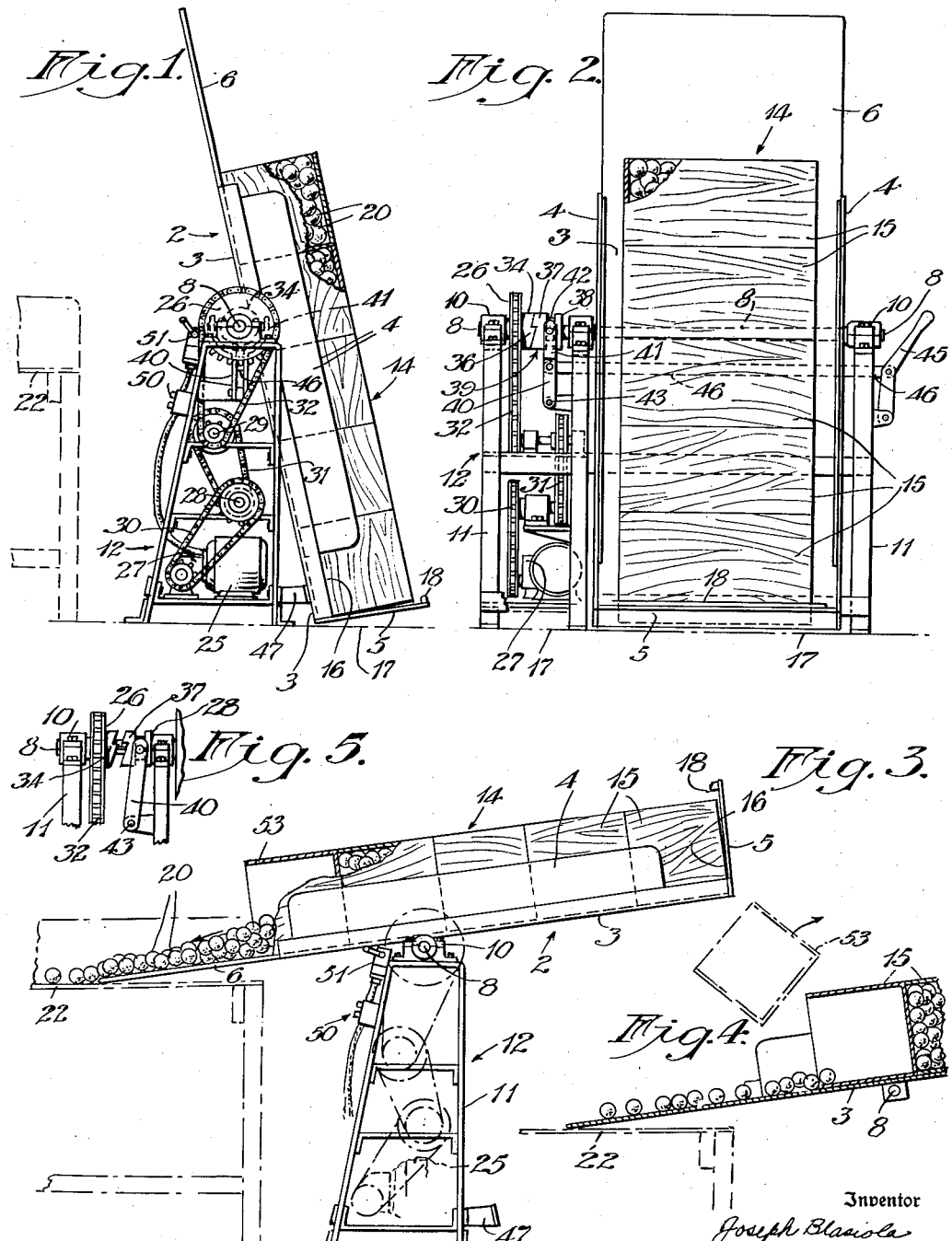

2,513,076

UNITED STATES PATENT OFFICE 2,513,076

FIELD FRUIT BOX DUMPER

Joseph Blasiola, Phoenix, Ariz.

Application April 24, 1947, Serial No. 743,532

1 Claim. (Cl. 214—1.1)

This invention relates to field fruit box dumpers. It pertains particularly to the handling of boxes used in harvesting citrus fruits. In practice, citrus fruit is picked from the trees and placed in "field" or "packout" boxes. These are open rectangular boxes of about the same size as fruit shipping boxes. These are placed on trucks and hauled to the packing sheds, where the fruit is washed, graded, waxed, wrapped and finally packed in shipping boxes. One of the steps necessary in this handling of the fruit is to empty the field boxes onto a sorting trough where they are spread out and inspected prior to being picked up by a conveyor to be carried on through the packing processes.

Obviously hand lifting of fruit boxes is avoided wherever possible, so it has been the practice in many sheds to unload the field boxes from the truck in stacks of four to seven, using a clamp hand truck to convey the stacks to the first receiving trough. There they were released from the clamp truck and were then lifted by hand from the stack and dumped, one at a time, so that the fruit was spread out evenly and fed to the conveyor at a substantially uniform rate. This hand lifting entailed considerable hard labor and, as loads were brought into the shed rapidly, required the services of several persons. During the periods between loads these persons were rendered idle and had to be shifted to other employment.

In view of the foregoing, I have devised a mechanism one object of which is to handle and dump the contents of these field boxes, one at a time, into the receiving trough or table.

Another object is to provide a tiltable table supported on trunnion bearings provided with a base to receive a vertical stack of boxes, and then tilt the stack to an inclined position so that the contents of the top box is spilled out on a receiving table but arranged so that the contents of the second box is retained until the first box is removed after it is empty, whereupon the contents of the second box rolls out on the table, and so on with the other boxes of the stack.

Another object is to provide a table, mounted on trunnion bearings, adapted to receive and hold a stack of field boxes when it is in a vertical position, and from a clamp truck, arranged with power mechanism to tilt to and slightly beyond a horizontal position so that boxes of the stack are slightly inverted with open tops directed toward a receiving table.

Other objects include the provision of power driven mechanism for tilting the table from the vertical loading position to and stopping at the slightly inclined dumping position, and then mechanism for returning it rapidly to the loading position.

Still further objects will appear hereinafter.

I attain these objects by means of the devices, construction and combination of parts illustrated in the accompanying drawings, in which:

Figure 1 is a side elevation of my device shown in the vertical or loading position;

Figure 2, a front elevation thereof;

Figure 3, a side elevation of the device in inclined or dumping position;

Figure 4, a fragmentary view of the table portion of my device showing its relation to the receiving and sorting table while dumping field boxes; and Figure 5 is a side elevation of a portion of the table supporting shaft and attached parts, showing the clutch in open position.

Similar numerals refer to similar parts in the several views.

The table 2 has a flat rectangular bed 3, with side wings 4, and an end plate 5. The end opposite this plate is open and terminates in an apron 6.

About midway of the length of bed 3 there is a trunnion shaft 8 secured to its bottom face. The ends of this shaft are journalled in bearings 10 at the top of side members 11 of supporting frame 12.

The table thus supported may be tilted from the position shown in Figure 1, which I term the loading position, to that shown in Figure 3 which is termed the dumping position. While in the loading position the table 2 is vertical, it is nevertheless inclined slightly to the rear toward frame 12 so that a stack 14 of field boxes 15 will lean against bed 3 when set on end plate 5. Wings 4 do not extend all the way to plate 5 so that side openings 16 are provided to accommodate the jaws of clamp hand trucks used to place the stack on plate 5. This plate extends from bed 3 at slightly more than a right angle so that it approaches the plane of floor 17 when in loading position. However it may be said to be substantially at right angles to said bed so that, after deposit, the stack 14 will either tilt over to the bed, or tend to tilt in this way. A bead 18 is formed along the outer edge of plate 5 to aid in securing the lower box of the stack during loading.

In the dumping position, the bed is inclined beyond the horizontal and the apron 6 depressed sufficiently so that fruit 20, contained in boxes 15, will roll out onto the receiving and inspection table 22 (see Figure 4).

Since the weight of the loaded boxes of the stack 14 must be lifted during this tilting motion, I provide power mechanism to turn shaft 8. This consists of motor 25, which drives sprocket 26 through speed reduction gearing 27, and sub shafts 28 and 29 and by chains 30, 31 and 32. Sprocket 26 is carried on hub 34, journalled to turn freely on the left end of shaft 8, and provided with clutch detent teeth 36 on its right hand or inner face. The teeth 36 on hub 34 are shaped to engage mating teeth on thimble 37 slidably keyed or splined on shaft 8 so as to move axially from engaging position, shown in Figure 2, to non-engaging position to the right thereof along the shaft as shown in Figure 5. This forms a clutch 39. The engaging and releasing motion of the clutch is accomplished by the yoke 40 which has tines 41 bearing in a groove 42 around thimble 37. Yoke 40 is supported on a bearing pin 43 so that its tines may have a lateral motion. This motion is controlled by hand lever 45 connected to the yoke by link 46.

The parts of the table 2 are proportioned and the shaft 8 positioned so that when empty it normally assumes the loading position with the lower end resting on bumper 47. In use, the stack 14 is loaded on the table in this position and the clutch 39 engaged. Motor 25 is then started by operating switch 50. The table is then tilted by the motion of sprocket 26 through the clutch until it reaches the dumping position where the bottom edge of bed 3 engages switch 51 and breaks the circuit through motor 25. The drag of the gearing and motor is then sufficient to retain the table in dumping position. The fruit in the top box then rolls out as shown in Figure 4 and this box 53 is removed by the operator, whereafter the fruit rolls out of successive boxes of the stack as the preceding empty boxes are removed. As boxes are removed fruit rolling from the lower boxes is kept from rolling off bed 3 by wings 4. When all boxes are empty and removed the operator disengages clutch 39, using lever 45. The table then resumes the vertical position and is ready to receive another stack. The operator then moves the clutch to engaging position and the device is ready for another operation.

The dumping action is very rapid and, since the fruit is rolled out of the boxes successively, an even supply is furnished the conveyor. Further, the operator need only handle empty boxes, which are removed one at a time. His other duties are merely to control the operation of the machine.

Whereas I have described one form of my device, I realize that it is subject to many modifications, and mechanical substitution of parts, all of which would remain, nevertheless, within the spirit of my invention. Therefore, I wish to be limited only by the following claim.

I claim:

A fruit box dumper for emptying a stack of field fruit boxes successively, including a supporting frame, a table having a flat bed, an outwardly extending end plate at its lower end, and an apron at its inner end, a pivotal support for said table including trunnions at each side thereof journalled in bearings on said supporting frame, said trunnions being positioned to balance said table so that it normally assumes a vertical loading position with said outer end lowered, in combination with means for tilting said table including, a motor operative in said frame, a sprocket journaled on one of said trunnions, gearing and belts connecting said motor to said sprocket, a clutch operative between said trunnion and said sprocket, a manual motor control switch and a cutout switch mounted on said frame and adapted to open the circuit to said motor when said table tilts to a position sufficiently inclined to permit gravity unloading of the fruit, and the drag of said motor, gearing and belts being sufficient to hold said table in dumping position when said clutch is engaged and the motor circuit open.

JOSEPH BLASIOLA.

REFERENCES CITED

The following references are of record in the file of this patent:

UNITED STATES PATENTS

| Number | Name | Date |
|---|---|---|
| 891,517 | Allen | June 23, 1908 |
| 1,498,732 | Jauch | June 24, 1924 |
| 2,172,685 | Thompson | Sept. 12, 1939 |
| 2,397,129 | Davis | Mar. 26, 1946 |
| 2,410,515 | McMichael | Nov. 5, 1946 |
| 2,498,740 | Miller | Feb. 28, 1950 |